(12) United States Patent
Hasegawa et al.

(10) Patent No.: US 7,529,316 B2
(45) Date of Patent: May 5, 2009

(54) TRANSMITTER

(75) Inventors: Norio Hasegawa, Tokyo (JP); Tetsuhiko Miyatani, Tokyo (JP); Yoshihiko Akaiwa, Munakata (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 590 days.

(21) Appl. No.: 10/940,956

(22) Filed: Sep. 15, 2004

(65) Prior Publication Data
US 2005/0063485 A1 Mar. 24, 2005

(30) Foreign Application Priority Data
Sep. 18, 2003 (JP) ............................. 2003-325798

(51) Int. Cl.
*H04K 1/02* (2006.01)
(52) U.S. Cl. ..................... 375/296; 375/135; 375/146; 375/297; 375/299; 455/522; 455/63.1; 455/67.13; 455/114.2; 455/127.1; 455/127.2
(58) Field of Classification Search ................. 375/135, 375/146, 296–297, 299; 455/522, 63.1, 67.13, 455/114.2, 127.1–127.2
See application file for complete search history.

(56) References Cited

U.S. PATENT DOCUMENTS 6,009,090 A * 12/1999 Oishi et al. ................. 370/342

| | | | |
|---|---|---|---|
| 6,522,869 B1* | 2/2003 | Hiramatsu et al. | ........ 455/127.2 |
| 2002/0101936 A1* | 8/2002 | Wright et al. | ................ 375/296 |
| 2003/0022639 A1* | 1/2003 | Hongo et al. | ................ 455/116 |
| 2004/0052314 A1* | 3/2004 | Copeland | ..................... 375/296 |
| 2004/0136395 A1* | 7/2004 | Itahara et al. | ................ 370/441 |
| 2004/0266372 A1* | 12/2004 | McCallister | ............. 455/127.2 |

FOREIGN PATENT DOCUMENTS

JP 2002-185432 6/2002

OTHER PUBLICATIONS

English Translation of Notification of Reasons for Refusal issued Dec. 24, 2008 in corresponding Japanese Patent Application No. 2003-325798.

* cited by examiner

*Primary Examiner*—Shuwang Liu
*Assistant Examiner*—Kabir A Timory
(74) *Attorney, Agent, or Firm*—Wenderoth, Lind & Ponack, L.L.P.

(57) ABSTRACT

A transmitter, that effectively suppresses a peak level of transmit signals, equipped with a peak reduction signal generating means that generates a peak reduction signal. A level of the peak reduction signal is based on a transmit signal level threshold for determining a peak of the transmit signal, and is based on a transmit signal peak level. Further, a phase of the peak reduction signal is based on the phase of the transmit signal. The transmitter is also equipped with a peak reduction signal processing means that subjects the peak reduction signal to band restriction and orthogonal modulation, and is equipped with a transmit signal level suppressing means that subtracts the peak reduction signal subjected to band restriction and orthogonal modulation from the transmit signal.

9 Claims, 11 Drawing Sheets

TRANSMITTER

BACKGROUND OF THE INVENTION

1. Field of the Invention

This invention relates to a transmitter for transmitting transmit signals. More specifically, this invention relates to a transmitter that effectively suppresses the peak level of transmit signals.

2. Description of the Related Art

In a wireless communication system transmitter that utilizes CDMA (Code Division Multiple Access), for example, the peak level of the transmit signals is suppressed.

An example that can be cited explains that in a carrier synthesizing transmission circuit equipped with a limiter circuit, defining the ratio of the instantaneous power of the signal obtained by multiplexing all carriers to the average power thereof as the instantaneous peak factor, comparing the instantaneous peak factor with a reference value to determine a limit coefficient suitable for the required degree of clipping, and using the limit coefficient to apply required clipping to the instantaneous powers transmitted by the respective carriers before amplification by the power amplifier. (See, for example, Japanese Unexamined Patent Publication No. 2002-44054.)

In wireless communication and the like, however, since the frequency band used for communication is limited, a need arises to minimize the expansion of the frequency spectrum caused by the nonlinear distortion of the power and other amplifiers. This need in turn makes it necessary to operate the amplifiers in the linear region when, for example, amplifying code multiplex signals with the power and other amplifiers.

Moreover, consideration has been given to configuring conventional transmitters so as to limit the transmit signal level in the band-limited intermediate frequency (IF) region, for example. However, the conventional configuration has a problem in that it increases power leakage to outside the band more than it lowers the peak level.

It is also worth noting that reapplying band restriction to the output after carrying out peak reduction restores the original spectrum and also restores the original time waveform. This is a problem because the peak power limiting effect is also lost.

SUMMARY OF THE INVENTION

The present invention was accomplished in light of the foregoing circumstances and has as an object to provide a transmitter, that, when transmitting a transmit signal, can effectively suppresses the peak level of the transmit signal.

In order to achieve this object, the transmitter of the present invention conducts the following operations at the time of transmitting a transmit signal.

Peak reduction signal generating means generates a prescribed peak reduction signal. The peak reduction signal has a level based on a transmit signal level threshold for determining a peak of the transmit signal and based on a transmit signal peak level. Further, the peak reduction signal has a phase based on the phase of the transmit signal. Transmit signal level suppressing means subtracts the peak reduction signal generated by the peak reduction signal generating means from the transmit signal, thereby suppressing the level of the transmit signal.

Therefore, the transmit signal peak level can be effectively suppressed by, as explained in the foregoing, using the peak reduction signal having the prescribed level and prescribed phase based on the transmit signal to suppress the level of the transmit signal.

The transmit signal can be any of various types of signals.

Moreover, while the type of communication (receive or transmit) can, for example, be wireless communication, it can instead be wired communication.

The signal level can be any of various levels including, for example, the power level or the amplitude level.

The peak reduction signal can be any of various types of signals.

The transmit signal level threshold can take any of various values.

The signal position of the peak of the transmit signal can, for example, be a signal position where the level of the transmit signal is maximum. However, insofar as practically effective, some other signal position, such as one near the signal position where the level is maximum, can be deemed the signal position of the peak.

In a case such as where, for example, the peak reduction signal and the transmit signal are each composed of an I component and a Q component, the subtraction of the peak reduction signal from the transmit signal can be done in the manner of subtracting the I component of the peak reduction signal from the I component of the transmit signal and subtracting the Q component of the peak reduction signal from the Q component of the transmit signal.

The I component and Q component can, for example, be expressed one as a real number portion and the other as an imaginary number portion.

In one configuration, the transmitter of the present invention conducts the following operations.

Peak reduction signal processing means subjects the peak reduction signal generated by the peak reduction signal generating means to band restriction and orthogonal modulation. Then the transmit signal level suppressing means subtracts the peak reduction signal subjected to band restriction and orthogonal modulation by the peak reduction signal processing means from the transmit signal, thereby suppressing the level of the transmit signal.

Therefore, the peak of the transmit signal and the level in the vicinity thereof can be suppressed by using the band-restricted peak reduction signal to suppress the level of the transmit signal, whereby it is possible, for example, to achieve more effective peak level suppression than previously achieved. Specifically, both the effect of peak level suppression and the effect of reduction of power leakage to outside the band can be obtained.

The band restriction can be any of various types.

The orthogonal modulation can be any of various types.

Another configuration according to the present invention will now be explained.

In one configuration of the transmitter of the present invention, the peak reduction signal generating means retains the maximum value of the level of the transmit signal, generates a transmit signal threshold based on the level of the transmit signal, and generates, as the peak reduction signal, a signal having a level corresponding to the difference between the retained maximum value and the generated transmit signal threshold, and having the same phase as the phase of the transmit signal.

The maximum value of the level of the transmit signal can, for example, be the maximum value within a prescribed time period. The prescribed time period can be any of various periods.

The level of the transmit signal referenced for generating the transmit signal threshold can, for example, be an average value of such levels.

In one configuration of the transmitter of the present invention, the transmit signal includes a plurality of carrier signals. In one configuration, the peak reduction signal processing means multiplies, for the plurality of carrier signals, the result of synthesizing carrier transmit signals of the individual carrier signals, and prescribed coefficient data for applying band restriction, and complex-multiplies the multiplication result and the peak reduction signal. The complex-multiplication result is used as the peak reduction signal subjected to band restriction and orthogonal modulation.

The number of the multiple carrier signals can be any of various numbers.

The prescribed coefficient data can be any of various kinds of data.

The carrier signals of the individual carriers can be signals of any of various frequencies.

When another peak appears during processing of a certain peak, the transmitter of the present invention deals with the situation as set out in (1), (2) or (3) below.

(1) When another peak appears during processing of a certain peak, execution of processing by the peak reduction signal processing means with respect to the other peak is disabled (i.e., no processing is conducted).

(2) A plurality of peak reduction signal processing means are provided. Further, peak reduction signal processing results synthesizing means for synthesizing the outputs of the plurality of peak reduction signal processing means is provided. When another peak appears during processing of a certain peak by a certain peak reduction signal processing means, processing of the other peak is conducted by another peak reduction signal processing means, and when still another peak appears, processing of the other peak is conducted by another peak reduction signal processing means. The transmit signal level suppressing means subtracts the synthesized peak reduction signal result output by the peak reduction signal processing results synthesizing means from the transmit signal, thereby suppressing the level of the transmit signal.

(3) Peak reduction signal processing means capable of processing a plurality of peaks is provided. Further, peak reduction signal processing results synthesizing means for synthesizing the results of processing a plurality of peaks output by the peak reduction signal processing means is provided. The transmit signal level suppressing means subtracts the synthesized peak reduction signal result output by the peak reduction signal processing results synthesizing means from the transmit signal, thereby suppressing the level of the transmit signal.

In the transmitter of the present invention, the peak reduction signal generating means may be provided at any of various locations, may be provided as a single means or as a plurality of means, may be provided for a plurality of carriers collectively, or may be provided separately for each carrier.

In the transmitter of the present invention, the peak reduction signal processing means may be provided at any of various locations, may be provided as a single means or as a plurality of means, may be provided for a plurality of carriers collectively, or may be provided separately for each carrier.

The present invention has broad applicability. It can, for example, be applied to mobile telephone systems, Personal Handy phone Systems (PHS) or other such mobile communication systems, base station units of such mobile communication systems, base station transmitters that conduct high power amplification, wireless communication systems and wireless communication equipment utilizing CDMA, and transmit amplifiers and other amplifiers for amplifying transmit signals.

As explained in the foregoing, at the time of transmitting a transmit signal, the transmitter of the present invention generates a peak reduction signal having a level based on a transmit signal level threshold for determining the peak of the transmit signal and on the transmit signal peak level and has a phase based on the phase of the transmit signal, and subtracts the generated peak reduction signal from the transmit signal, thereby suppressing the level of the transmit signal. As a result, the level of the transmit signal peak can be effectively suppressed.

Moreover, the transmitter of the present invention subjects the generated peak reduction signal to band restriction and orthogonal modulation and subtracts the peak reduction signal subjected to the band restriction and orthogonal modulation from the transmit signal, thereby suppressing the level of the transmit signal. As a result, it is possible to realize the effects of both peak level suppression and reduction of power leakage to outside the band, thereby achieving effective peak level suppression.

DETAILED DESCRIPTION OF THE INVENTION

Figure 1:
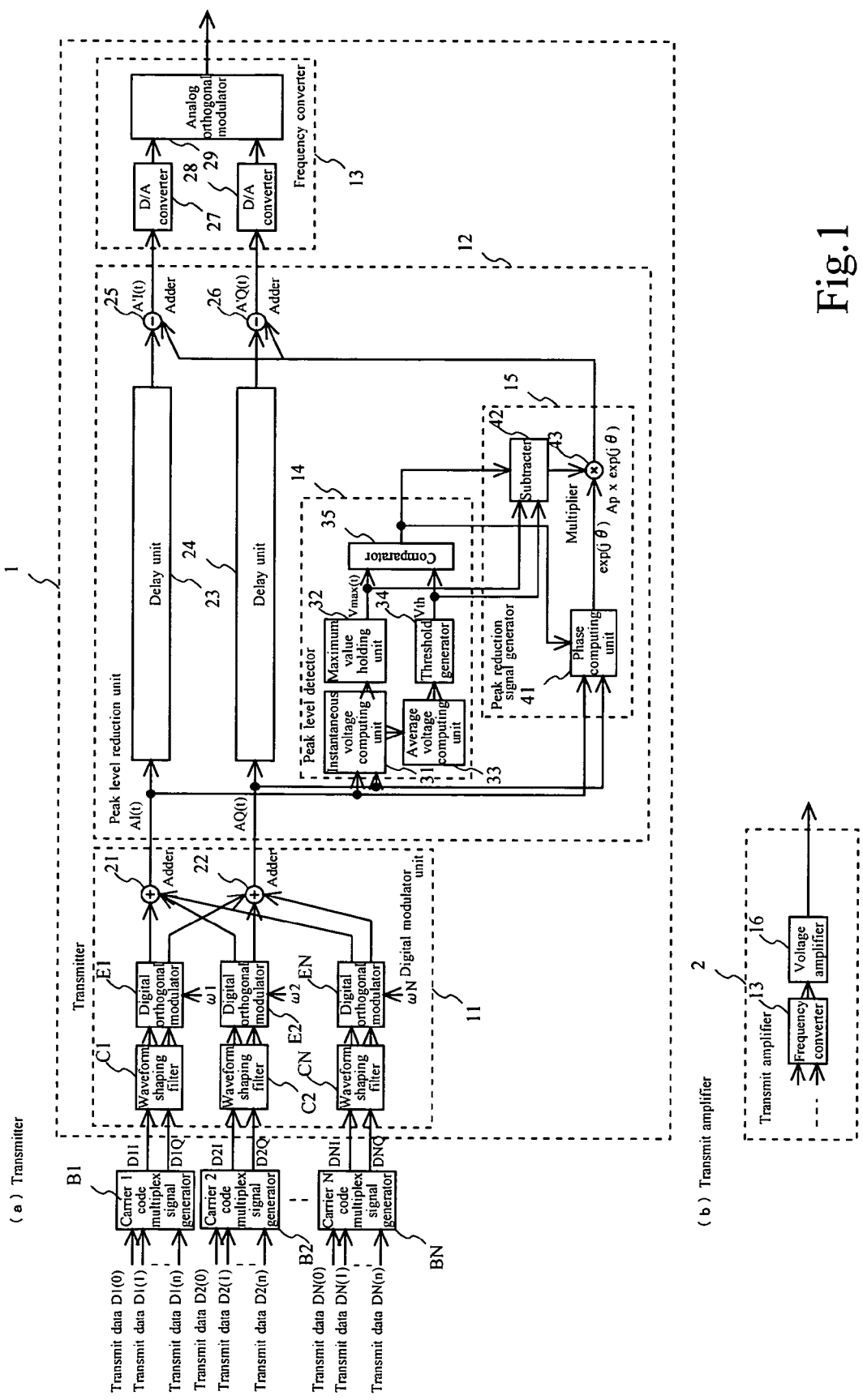
FIG. 1 is a set of diagrams showing exemplary configurations of a transmitter and a transmit amplifier according to a first embodiment of the present invention.

Embodiments of the present invention will now be explained with reference to the drawings.

As a preferred implementation of the present invention, the embodiments will focus on application of the invention to a transmitter incorporated in the base station unit of a wireless communication system utilizing CMDA.

It should be noted that the present invention is also compatible with the OFDM (Orthogonal Frequency Division Multiplex) and other such modulation methods, although cases may arise in which amount of signal peak reduction is restricted.

In the embodiments, similar constituents are designated by similar reference numerals, and explanation thereof will be repeated.

FIRST EMBODIMENT

A first embodiment of the present invention will be explained.

FIG. 1(a) shows the configuration of the transmitter 1 of this embodiment. B1 to BN in this figure designate code multiplex signal generators associated with N number (N>1) of carriers (carriers 1-N).

The transmitter 1 of this embodiment is equipped with a digital modulator unit 11, peak level reduction unit 12, and frequency converter 13.

The digital modulator unit 11 is equipped with N number of waveform shaping filters C1-CN, N number of digital orthogonal modulators E1-EN, an adder (synthesizer) 21 for I component signals (I signals), and an adder (synthesizer) 22 for Q component signals (Q signals).

The peak level reduction unit 12 is equipped with a delay unit 23 and subtracter 25 associated with the I signal, a delay unit 24 and subtracter 26 associated with the Q signal, a peak level detector 14, and a peak reduction signal generator 15.

The peak level detector 14 is equipped with an instantaneous voltage computing unit (effective voltage computing unit) 31, a maximum value holding unit 32, an average voltage computing unit 33, a threshold generator 34, and a comparator 35.

The peak reduction signal generator 15 is equipped with a phase computing unit 41, a subtracter 42, and a multiplier 43.

The frequency converter 13 is equipped with a D/A (digital-to-analog) converter 27 associated with the I signal, a D/A converter 28 associated with the Q signal, and an analog orthogonal modulator 29.

FIG. 1(b) shows the configuration of a transmit amplifier 2 of this embodiment.

The transmit amplifier 2 of this embodiment is constituted by installing a voltage amplifier 16 as the next stage after the frequency converter 13 in a configuration like that of the transmitter 1 shown in FIG. 1(a). The voltage amplifier 16 amplifies and outputs the output signal from the frequency converter 13.

The explanation made hereinafter regarding the transmitter 1 shown in FIG. 1(a) also applies to the transmit amplifier 2 shown in FIG. 1(b).

Each of the code multiplex signal generators B1-BN installed outside the transmitter 1 in this embodiment is, for example, input with (n+1) number, i.e., a plurality, of sets of transmit data Di(0)-Di(n) (i=1–N), multiplies each set of transmit data by a code multiplex signal series to cause spread spectrum modulation, and synthesizes the spread-spectrum modulated signals into each carrier. The code multiplex signal generators B1-BN output the resulting I signals DiI and Q signals DiQ to the transmitter 1. The outputs from the code multiplex signal generators B1-BN are inputs to the associated waveform shaping filters C1-CN provided in the transmitter 1.

An example of the operations performed by the transmitter 1 of this embodiment is described below.

The digital modulator unit 11 has the function of subjecting the transmit signal to waveform forming and digital orthogonal modulation.

The waveform shaping filters C1-CN perform spectrum shaping so as to make the band occupied by the carrier outputs that were spread-spectrum modulated and synthesized in the code multiplex signal generators B1-BN fit within a preset value.

The digital orthogonal modulators E1-EN subject the spectrum-shaped outputs from the waveform shaping filters C1-CN to digital orthogonal modulation.

The adders 21 and 22 receive the outputs obtained by subjecting the individual carriers to digital orthogonal modulation in the digital orthogonal modulators E1-EN and sum them for N number of carriers, separately for the I phase and Q phase.

The peak level reduction unit 12 has a function of reducing the peak signal levels projecting from the outputs of the adders 21 and 22 (transmit signal) and the signal level in the vicinity of the peaks.

The peak level detector 14 has a function of comparing the effective voltages of the outputs from the adders 21 and 22 with a threshold level to detect the peak level.

The instantaneous voltage computing unit 31 calculates the effective voltage Vint(t) of the output signal AI(t) from the adder 21 associated with the I signal and the output signal AQ(t) form the adder 22 associated with the Q signal. The effective voltage Vint(t) is represented by Equation 1, in which t is time.

$$V\text{int}(t)=\sqrt{AI(t)^2+AQ(t)^2} \quad \text{(Eq. 1)}$$

The maximum value holding unit 32 detects the maximum value Vmax(t) of the effective voltage Vint(t) within the observation period.

The average voltage computing unit 33 uses the effective voltage Vint(t) calculated by the instantaneous voltage computing unit 31 to calculate the average voltage Avg of the output signals from the adders 21 and 22. The average voltage Avg can, for example, be represented by Equation 2, in which T is the time period over which averaging is conducted.

$$Avg = (1/T) \times \sum_{t=1}^{T} V\text{int}(t) \quad \text{(Eq. 2)}$$

The threshold generator 34 uses the average voltage that is the output from the average voltage computing unit 33 to set a threshold voltage (transmit signal level threshold) Vth for conducting peak reduction.

By way of example, where the threshold voltage Vth is defined as (average voltage+6 db), it is set according to Equation 3.

$$V\text{th}=Avg \times 10^{(+6/20)} \quad \text{(Eq. 3)}$$

The comparator 35 compares the magnitudes of the maximum value Vmax(t) from the maximum value holding unit 32 and the threshold voltage Vth from the threshold generator 34 to conduct peak detection. For example, when the maximum value Vmax(t) from the maximum value holding unit 32 is equal to or greater than the threshold voltage Vth from the threshold generator 34, or when the maximum value Vmax(t) is greater than the threshold voltage Vth, it is deemed that a peak is present and the peak is detected.

The peak reduction signal generator 15 has a function of using the outputs from the adders 21 and 22 and the output from the peak level detector 14 to generate a peak reduction signal.

Based on the output from the comparator 35, which constitutes peak detection information, the subtracter 42 carries out a subtraction between the output voltage Vmax(t) from the maximum value holding unit 32 and the output voltage Vth from the threshold generator 34. The subtraction result Ap is, for example, represented in the manner of Equation 4.

$$Ap = \begin{cases} V\max(t) - Vth & \ldots \quad (V\max(t) > Vth) \\ 0 & \ldots \quad (V\max(t) \leq Vth) \end{cases} \quad \text{(Eq. 4)}$$

Based on the output from the comparator 35, which constitutes peak detection information, the phase computing unit 41, calculates the phase θ (cosine and sine) of the data input to the peak level reduction unit 12 at time t=s of peak detection.

By way of example, the result of the calculation is represented in the manner of Equation 5, in which j is the imaginary number portion.

$$e^{j\theta} = \cos\theta + j\sin\theta \ldots \begin{cases} \cos\theta = \cos\{\arctan(AQ(s)/AI(s))\} \\ \sin\theta = \sin\{\arctan(AQ(s)/AI(s))\} \end{cases} \quad \text{(Eq. 5)}$$

The multiplier 43 carries out multiplication between the output signal Ap from the phase computing unit 41 and the output signal $e^{j\theta}$ from the phase computing unit 41 to calculate a peak reduction signal mu(t). The peak reduction signal mu(t) is represented in the manner of Equation 6.

$$mul(t) = Ap \times e^{j\theta} \quad \text{(Eq. 6)}$$

The delay units 23 and 24 conduct delay adjustment on the output signals from the adders 21 and 22, separately for the I phase and Q phase, until the peak reduction signal is output by the peak reduction signal generator 15.

The subtracters 25 and 26 conduct subtraction between the peak reduction signal mu(t) output from the peak reduction signal generator 15 and the output signals from the delay units 23 and 24, separately for the I phase and Q phase, thereby reducing the peak level signal.

The peak level reduction unit 12 outputs from the subtracter 25 associated with the I signal an I signal A'I(t) as represented by the upper of Equations 7 and from the subtracter 26 associated with the Q signal a Q signal A'Q(t) as represented by the lower of Equations 7. In the Equations 7, Re represents the real number portion and Im represents the imaginary number portion.

$$\begin{cases} A'I(t) = AI(t) - \text{Re}\{mul(t)\} \\ A'Q(t) = AQ(t) - \text{Im}\{mul(t)\} \end{cases} \quad \text{(Eqs. 7)}$$

The frequency converter 13 has a function of converting the frequency of the transmit signal and carry out analog orthogonal modulation.

The D/A converters 27 and 28 convert the digital signals output from the subtracters 25 and 26 to analog signals, separately for the I phase and Q phase.

The analog orthogonal modulator 29 carries out frequency conversion on the outputs from the D/A converters 27 and 28, whereby they are converted to a wireless frequency and output.

Thus, as explained in the foregoing, the transmitter 1 of this embodiment, which is configured to conduct transmission using one or more carrier frequencies, is equipped with: (i) the digital modulator unit 11 for conducting digital modulation of the transmit signal; (ii) the peak level detector 14 for comparing the output from the digital modulator unit 11 and a threshold level to detect the peak level; (iii) one or more peak reduction signal generators 15 for using the output from the digital modulator unit 11 and the output from the peak level detector 14 to generate a peak reduction signal; (iv) the delay units 23 and 24 for delaying the output signals from the digital modulator unit 11; (v) the subtracters 25 and 26 for subtracting the output of the peak reduction signal generator 15 from the outputs of the delay units 23 and 24; and (vi) the frequency converter 13 for frequency converting the outputs from the subtracters 25 and 26 to the wireless frequency region.

Owing to this configuration, the transmitter I of this embodiment can effectively achieve peak level suppression with respect to the transmit signal.

Although in this embodiment the peak level suppression is performed with respect to the output signal from the digital modulator unit 11, it is also possible, for example, to utilize a peak level suppression function similar to that of this embodiment to conduct peak level suppression in the stage preceding the digital modulator unit 11 or within the digital modulator unit 11.

In the transmitter 1 of this embodiment, the peak reduction signal generating means is constituted by the peak reduction signal generating function exhibited by the peak level detector 14 and peak reduction signal generator 15, and the transmit signal level suppressing means is constituted by the function of subtracting the peak reduction signal from the transmit signal exhibited by the subtracters 25 and 26.

SECOND EMBODIMENT

A second embodiment of the present invention will now be explained.

FIG. 2(a) shows the configuration of a transmitter 3 of this embodiment. It also shows code multiplex signal generators B1-BN associated with N number (N>1) of carriers (carriers 1-N).

The transmitter 3 is equipped with the digital modulator unit 11, m number of peak level reduction units F1-Fm (m>1), and the frequency converter 13. The peak level reduction units F1-Fm are identical in configuration and operation.

The transmitter 3 of this embodiment is, in its general configuration, different from the transmitter 1 of FIG. 1(a) in the point that it is equipped with the plurality of peak level reduction units F1-Fm connected in series and in the point that each of the peak level reduction units F1-Fm is equipped with a peak reduction signal modulator 17 and a peak reduction signal synthesizer 18.

In the transmitter 3 of this embodiment, each of the peak level reduction units F1-Fm subjects the output signal from the associated peak reduction signal generator 15 to band restriction and orthogonal modulation.

FIG. 2(b) shows the configuration of a transmit amplifier 4 of this embodiment.

The explanation made hereafter regarding the transmitter 3 shown in FIG. 2(a) also applies to the transmit amplifier 4 shown in FIG. 2(b).

An example of the operations performed by the transmitter 3 of this embodiment is described below.

The first peak level reduction unit F1 has a function of reducing the peak signal level projecting from the outputs of the adders 21 and 22 and the signal level in the vicinity of the peak.

Figure 3:
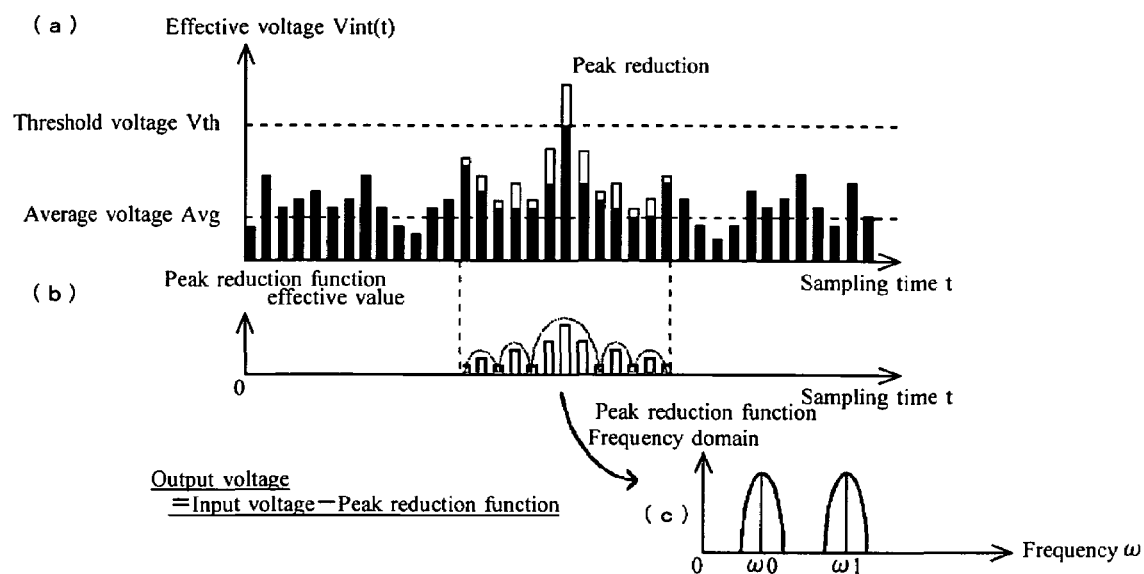
FIG. 3 is a set of diagrams for explaining the principle of peak level reduction in the time-axis domain.

FIG. 3 exemplifies the principle of peak level reduction in the time-axis domain utilized by the transmitter 3 of this embodiment.

The lateral axis in FIG. 3(a) represents sampling time t and the vertical axis represents effective voltage Vint(t). The graph shows transmit signal level with respect to time axis.

The lateral axis in FIG. 3(b) represents sampling time t and the vertical axis represents peak reduction function effective value. This graph shows effective value of peak reduction signal (peak reduction function) with respect to time axis.

The lateral axis in FIG. 3(c) represents frequency ω and the vertical axis represents peak reduction function effective value. This graph shows effective value of peak reduction signal with respect to frequency axis.

This embodiment is configured to subtract the band-restricted peak reduction signal from the peak signal exceeding the threshold voltage Vth and the signals in the vicinity thereof.

The peak reduction signal modulator 17 has a function of performing band restriction and digital orthogonal modulation on the peak reduction signal generated by the peak reduction signal generator 15.

An FIR coefficient memory 51 stores, for example, prescribed coefficient data p(t) symmetrical with respect to s=0 and the coefficient data p(t) is read from the memory region based on the peak detection information output from the comparator 35.

In the FIR coefficient memory 51, the data is normalized so that the peak detection time t=s is the center address and has a value of p(s)=1.

The purpose in using the FIR coefficient memory 51 is to prevent the spectrum expansion that would otherwise arise when peak reduction is implemented and to band-restrict the peak reduction signal itself. For example, if the coefficient length (e.g., the time width during which the coefficient data is provided) is lengthened, the band restriction becomes advantageous in proportion.

A modulator 52 synthesizes the carrier transmit signals of the carriers used by the digital modulator unit 11 relative to time t=s at peak detection and modulates the output data from the FIR coefficient memory 51.

When the carrier transmit signals of the carriers are synthesized, the output signal Mod(t) from the modulator 52 is represented in the manner of Equation 8. The frequencies of the carrier transmit signals of the carriers are denoted as ωk (k=1–N).

$$\text{Mod}(t) = p(t)/N \times \sum_{k=1}^{N} e^{j\{\omega k(t-s)\}} \qquad \text{(Eq. 8)}$$

A complex multiplier 53 performs complex-multiplication on the output signal from the multiplier 43 of the peak reduction signal generator 15 and the output signal from the modulator 52 of the peak reduction signal modulator 17. In other words, it performs band restriction on the peak reduction signal that is the output from the multiplier 43. The output signal Pr(t) from the complex multiplier 53 is represented in the manner of Equation 9.

$$Pr(t) = Ap \times p(t)/N \times \sum_{k=1}^{N} e^{j\{\omega k(t-s)+\theta\}} \qquad \text{(Eq. 9)}$$

The peak reduction signal synthesizer 18 is provided to deal with cases in which peaks are consecutively detected. It conducts synthesis in a manner that takes into account the delay time of the output signal from the complex multiplier 53 and calculates a post-synthesis peak reduction signal (peak reduction function) coef(t).

Figure 4:
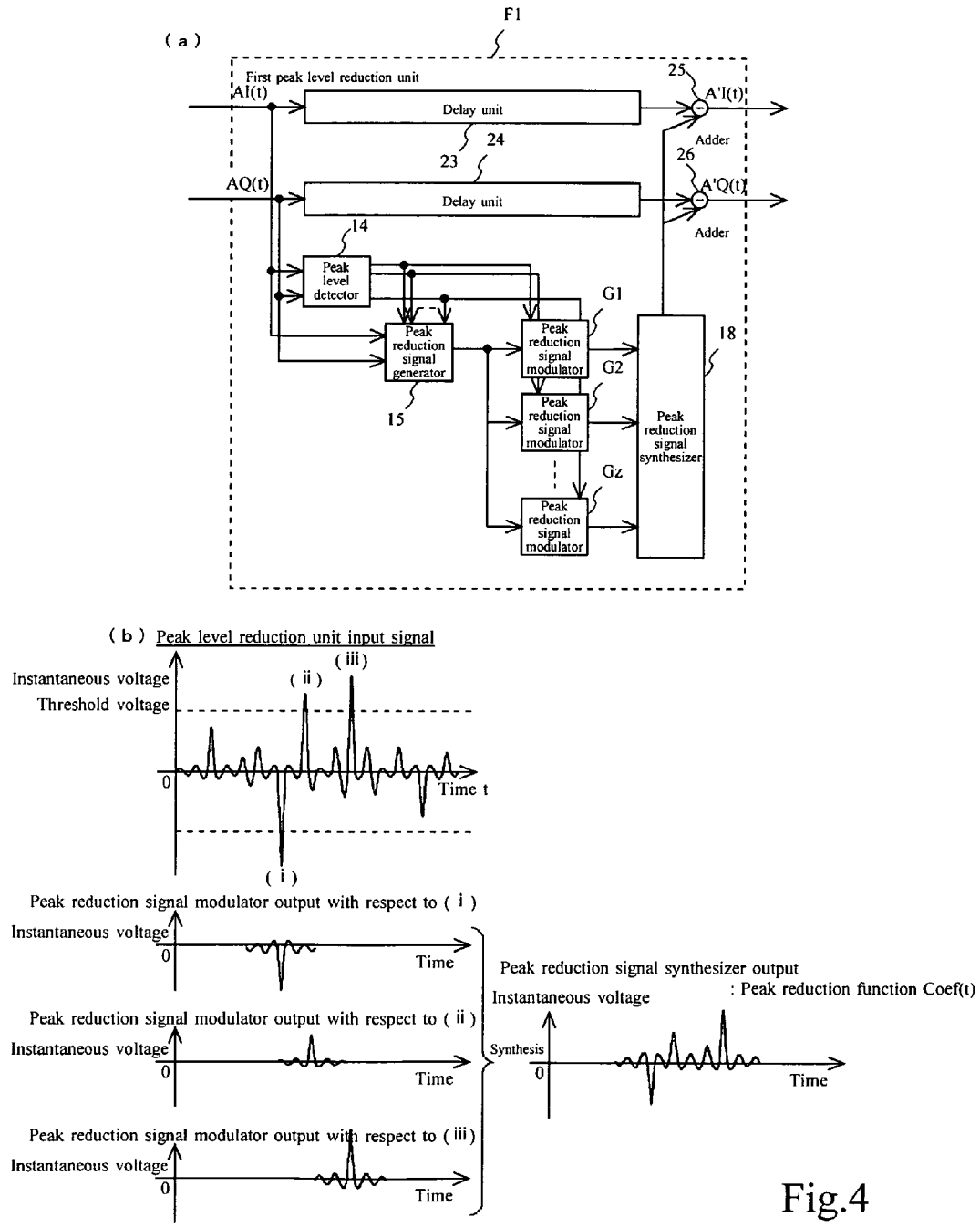
FIG. 4 is a set of diagrams showing an exemplary configuration of a peak reduction signal synthesizer and examples of time-axis waveforms.

FIG. 4(a) shows another configuration of the first peak level reduction unit F1.

The peak level reduction unit F1 shown in FIG. 4(a) is equipped with z number (z>1) of peak reduction signal modulators G1-Gz. The outputs from the z number of peak reduction signal modulators G1-Gz are synthesized by the peak reduction signal synthesizer 18.

FIG. 4(b) shows an example of a transmit signal having multiple peaks (i), (ii) and (iii) (signal input to the first peak level reduction unit F1), the output signal from the peak reduction signal modulator 17 for each of the peaks (i), (ii) and (iii), and the time-axis waveform of the coef(t) of what is obtained by synthesizing the peak reduction signal modulation results with respect to the peaks (i), (ii) and (iii). In each graph, the lateral axis represents time and the vertical axis represents instantaneous voltage.

When the peak level detector 14 detects a peak, the FIR coefficient memory 51 in the first peak reduction signal modulator G1 activates. In the example shown in FIG. 4(a) multiple peak reduction signal modulators G1-Gz are provided for dealing with the case where peaks are detected when the FIR coefficient memory 51 is busy.

The peak reduction signal modulators G1-Gz activate successively with successive peak detections and the output signals from the peak reduction signal modulators G1-Gz are synthesized by the peak reduction signal synthesizer 18. In this case, from the viewpoint of processing on the time axis, the synthesis is performed as shown in FIG. 4(b).

In a case where no peak is detected while the FIR coefficient memory 51 is active, the peak reduction signal synthesizer 18 need not be provided.

The delay units 23 and 24 conduct delay adjustment on the output signals from the adders 21 and 22 until the peak reduction signal synthesis result coef(t) is output by the peak reduction signal synthesizer 18.

The subtracters 25 and 26 conduct subtraction between the peak reduction signal synthesis result received from the peak reduction signal synthesizer 18 and the output signals from the delay units 23 and 24 to conduct peak level signal reduction, and output from the first peak level reduction unit F1 a processing result composed of the I signal A'I(t) and Q signal A'Q(t) represented by Equations 10

$$\begin{cases} A'I(t) = AI(t) - \text{Re}\{coef(t)\} \\ A'Q(t) = AQ(t) - \text{Im}\{coef(t)\} \end{cases} \qquad \text{(Eqs. 10)}$$

The output from the first peak level reduction unit F1 is sent to the second peak level reduction unit F2, whereafter the same operations, as conducted in the first peak level reduction unit F1, are repeated in each successive peak level reduction unit F until an output is obtained from the $m^{th}$ peak level reduction unit Fm.

The D/A converters 27 and 28 in the frequency converter 13 convert the I component and Q component of the digital signal output from the $m^{th}$ peak level reduction unit Fm to analog signals. The analog orthogonal modulator 29 carries out frequency conversion on the outputs of the D/A converters 27 and 28, whereby they are converted to a wireless frequency and output.

Thus, as explained in the foregoing, the transmitter 3 of this embodiment, which is configured to conduct transmission using one or more carrier frequencies, is equipped with: (i) the digital modulator unit 11 for conducting digital modulation of the transmit signal; (ii) the peak level detector 14 for comparing the output signal from the digital modulator unit 11 and a threshold level to detect the peak level; (iii) one or more peak reduction signal generators 15 for using the output signal from the digital modulator unit 11 and the output signal from the peak level detector 14 to generate a peak reduction signal; (iv) one or more peak reduction signal modulators 17, G1-Gz, optionally the peak reduction signal synthesizer 18 for synthesizing the output signals from the one or more peak reduction signal modulators 17, G1-Gz; (v) the delay units 23 and 24 for delaying the output signals from the digital modulator unit 11; and (vi) the subtracters 25 and 26 for subtracting the output of the peak reduction signal synthesizer 18 from the outputs of the delay units 23 and 24. Moreover, the transmitter 3 of this embodiment is equipped with the plurality of peak level reduction units F1-Fm for carrying out the peak level reduction operation a number of times and is equipped with the frequency converter 13 for frequency converting the output of the final $m^{th}$ peak level reduction unit Fm processed by the subtracters 25 and 26 to the wireless frequency region.

Thus, the transmitter 3 of this embodiment carries out band restriction on the peak reduction signal (peak reduction function) to calculate a band-restricted peak reduction signal (peak reduction function), then, at the stage after the digital modulator unit 11, uses the subtracters 25 and 26 to reduce the peak of the transmit signal and the amplitude in the vicinity of the peak, thereby making it possible to realize both voltage reduction and restriction of power leakage to outside the band. It is also possible, for example, to adopt a configuration that uses the subtracters 25 and 26 to reduce the peak of the transmit signal and the amplitude in the vicinity of the peak within the digital modulator unit 11.

In this manner, when the transmitter 3 of this embodiment effects peak suppression, with respect to the amplifier, by generating the peak reduction signal and subtracting the peak reduction signal from the digitally modulated signal, it subjects the peak reduction signal to band restriction and orthogonal modulation, thereby enabling effective suppression of peak level.

In the transmitter 3 of this embodiment, the peak reduction signal processing means is constituted by the function of the peak reduction signal modulators 17, G1-Gz, which subject the peak reduction signal to band restriction and orthogonal modulation. Further, the peak reduction signal processing results synthesizing means is constituted by the function of the peak reduction signal synthesizer 18 that synthesizes a plurality of peak reduction signals subjected to band restriction and orthogonal modulation.

THIRD EMBODIMENT

A third embodiment of the present invention will now be explained.

Figure 5:
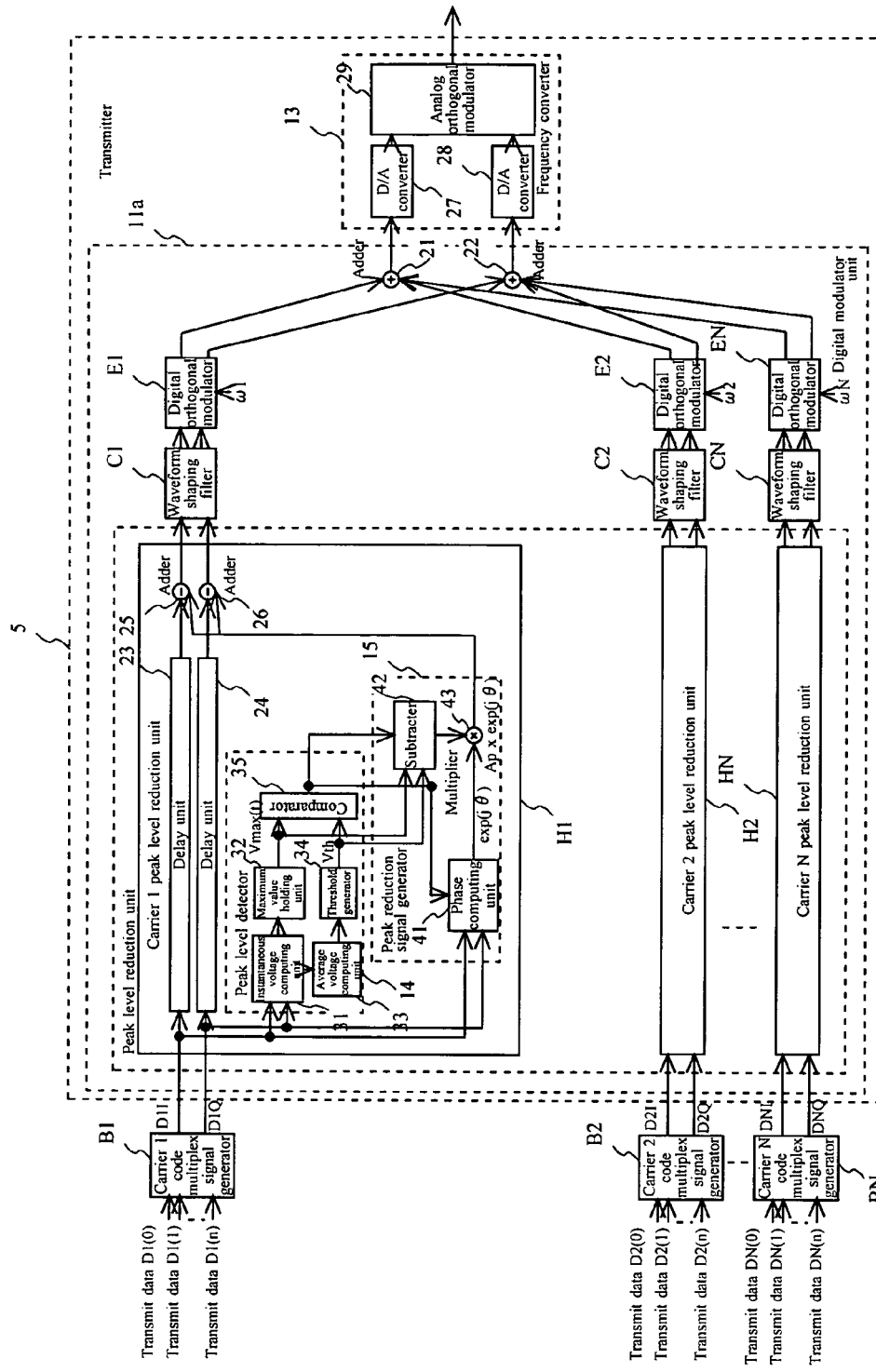
FIG. 5 is a diagram showing an exemplary configuration of a transmitter according to a third embodiment of the present invention.

FIG. 5 shows the configuration of a transmitter 5 of this embodiment. It also shows code multiplex signal generators B1-BN associated with N number (N>1) of carriers (carriers 1-N). It should be noted that application to a transmit amplifier is also possible, although no drawing or explanation relating to such application is shown.

The transmitter 5 of this embodiment has the general configuration obtained by, in a configuration such as that of the transmitter 1 shown in FIG. 1(*a*), eliminating the peak level reduction unit 12, connecting a digital modulator unit 11*a* and the frequency converter 13, and installing peak level reduction units H1-HN having the same configuration as the peak level reduction unit 12 at the stage before the waveform shaping filters C1-CN.

In the transmitter 5 of this embodiment, peak level reduction processing is conducted in the digital modulator unit 11*a*, separately, for each carrier, before band restriction is conducted by the waveform shaping filters C1-CN. In other words, since a peak reduction signal is generated and subtracted from the not yet modulated input signal prior to band restriction by the waveform shaping filters C1-CN, it is possible, for example, to eliminate the need for a function for subjecting a peak level reduction signal to band restriction and orthogonal modulation.

Thus, as explained in the foregoing, the transmitter 5 of this embodiment, which is configured to conduct transmission using one or more carrier frequencies, is, in each digital modulator unit 11*a* for conducting digital modulation of the transmit signal, equipped with the peak level detector 14 for comparing the signal input to the digital modulator unit 11*a* and a threshold level, separately for each carrier, to detect the peak level. Further, the transmitter 5 is equipped with one or more peak reduction signal generators 15 for using the signal input to the digital modulator unit 11*a* and the output from the peak level detector 14 to generate a peak reduction signal separately for each carrier, the delay units 23 and 24 for delaying the input signal separately for each carrier, and the subtracters 25 and 26 for subtracting the output of the peak reduction signal generator 15 from the outputs of the delay units 23 and 24 separately for each carrier. Moreover, the transmitter 5 of this embodiment is provided with digital modulation means (waveform shaping filters C1-CN, digital orthogonal modulators E1-EN, adders 21 and 22) for, after output from the subtracters 25 and 26, conducting band restriction separately for each carrier and synthesizing a plurality of carriers.

FOURTH EMBODIMENT

A fourth embodiment of the present invention will now be explained.

Figure 6:
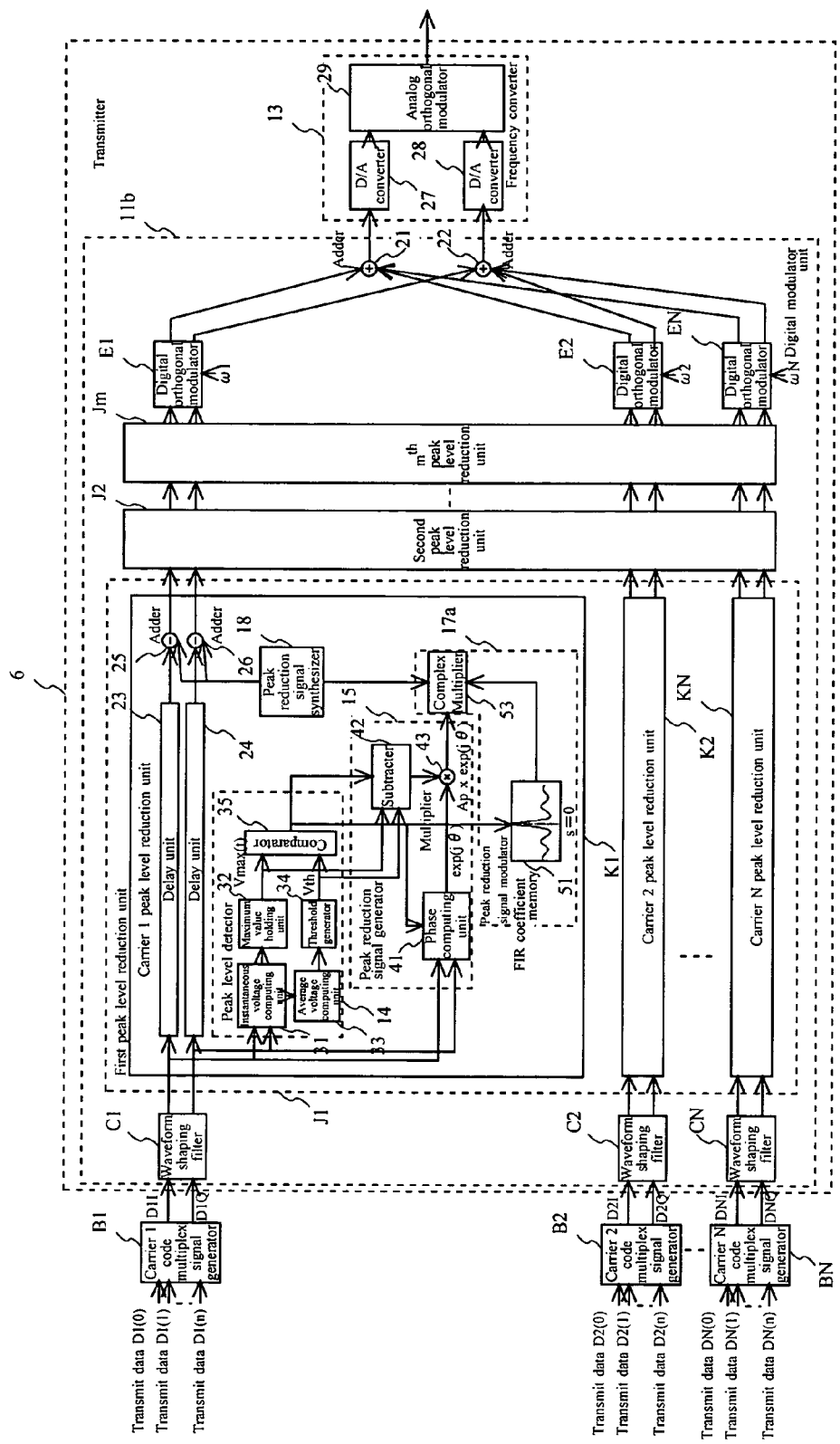
FIG. 6 is a diagram showing an exemplary configuration of a transmitter according to a fourth embodiment of the present invention.

FIG. 6 shows the configuration of a transmitter 6 of this embodiment. It also shows code multiplex signal generators B1-BN associated with N number (N>1) of carriers (carriers 1-N). It should be noted that application to a transmit amplifier is also possible, although no drawing or explanation relating to such application is shown.

Figure 2:
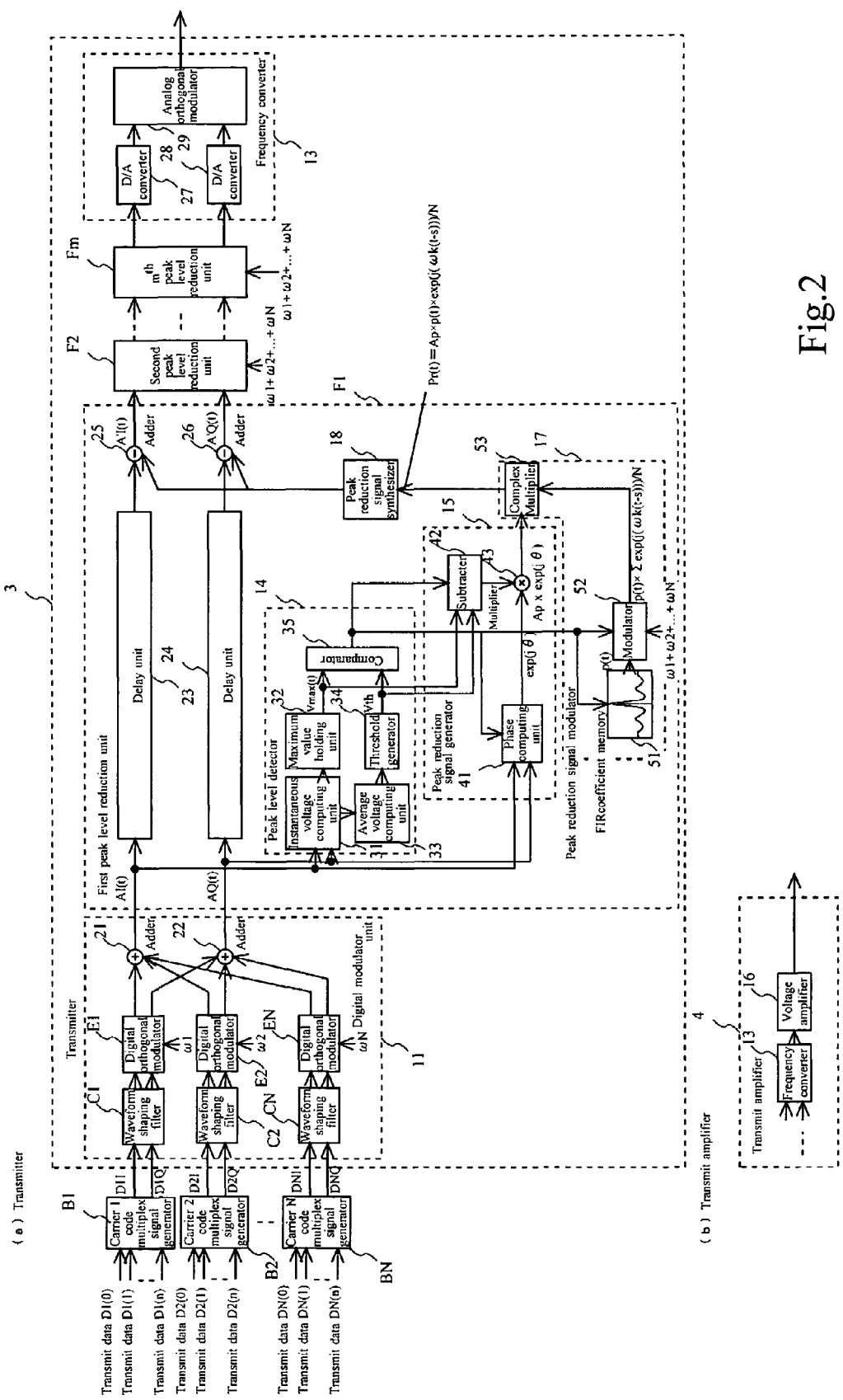
FIG. 2 is a set of diagrams showing exemplary configurations of a transmitter and a transmit amplifier according to a second embodiment of the present invention.

The transmitter 6 of this embodiment has the general configuration obtained by, in a configuration such as that of the transmitter 3 shown in FIG. 2(*a*), eliminating the peak level reduction units F1-Fm, connecting a digital modulator unit 11*b* and the frequency converter 13, and installing a plurality of peak level reduction units (groups) J1-Jm in series between the waveform shaping filters C1-CN in the digital modulator unit 11*b* and the digital orthogonal modulators E1-EN.

Moreover, the peak level reduction units J1-Jm are provided internally with peak level reduction units K1-KN for the individual carriers. The peak level reduction units K1-KN associated with the individual carriers have the same configuration as the peak level reduction units F1-Fm of the transmitter 3 shown in FIG. 2(a), except that the peak reduction signal modulator 17a is not provided with the modulator 52. In each peak reduction signal modulator 17a of this embodiment, the coefficient data output from the FR coefficient memory 51 is input to the complex multiplier 53 to be complex-multiplied with the output of the peak reduction signal generator 15.

In the transmitter 6 of this embodiment, peak voltage reduction appropriate for the individual carrier levels can be achieved by, for example, carrying out the reduction of peak voltage by effecting peak level reduction processing multiple times separately for each carrier. The transmitter 6 of this embodiment makes it possible, for example, to eliminate the need for the function of the modulator 52 of the transmitter 3.

Thus, as explained in the foregoing, the transmitter 6 of this embodiment, which is configured to conduct transmission using one or more carrier frequencies, is, in the digital modulator unit 11b for conducting digital modulation of the transmit signal, equipped with: (i) the waveform shaping filters C1-CN for subjecting the individual carrier input signals to band restriction; (ii) the peak level detectors 14 for comparing the output signals from the waveform shaping filters C1-CN and a threshold level, separately for each carrier, to detect the peak level; (iii) one or more peak reduction signal generators 15 for using the output signals from the waveform shaping filters C1-CN and the output from the peak level detector 14 to generate a peak reduction signal separately for each carrier; (iv) one or more peak reduction signal modulators 17a for subjecting the peak reduction signal to band restriction and digital orthogonal modulation separately for each carrier; (v) the peak reduction signal synthesizers 18 for, as required, synthesizing the output signals from the one or more peak reduction signal modulators 17a separately for each carrier; (vi) the delay units 23 and 24 for delaying the output signals from the waveform shaping filters C1-CN separately for each carrier; and (vii) the subtracters 25 and 26 for subtracting the output of the peak reduction signal synthesizers 18 from the outputs of the delay units 23 and 24 separately for each carrier. Moreover, the transmitter 6 of this embodiment is provided with a digital modulation means (digital orthogonal modulators E1-EN, adders 21 and 22) for, after multiple operations by the peak level reduction units (groups) J1-Jm, conducting digital orthogonal modulation and synthesizing a plurality of carriers.

FIFTH EMBODIMENT

A fifth embodiment of the present invention will now be explained.

Figure 7:
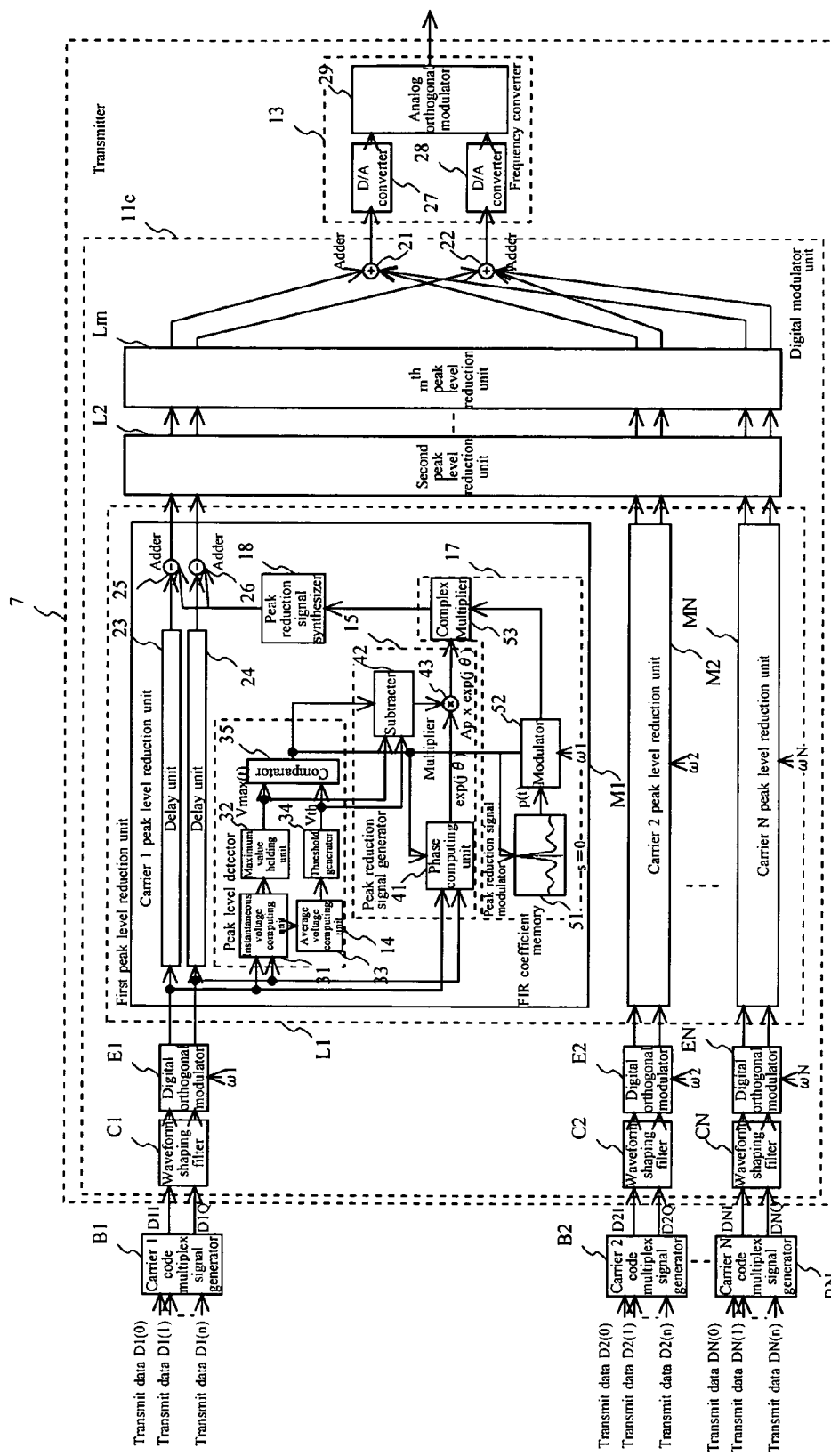
FIG. 7 is a diagram showing an exemplary configuration of a transmitter according to a fifth embodiment of the present invention.

FIG. 7 shows the configuration of a transmitter 7 of this embodiment. It also shows code multiplex signal generators B1-BN associated with N number (N>1) of carriers (carriers 1-N). It should be noted that application to a transmit amplifier is also possible, although no drawing or explanation relating to such application is shown.

The transmitter 7 has the general configuration obtained by, in a configuration such as that of the transmitter 3 shown in FIG. 2(a), eliminating the peak level reduction units F1-Fm, connecting a digital modulator unit 11c and the frequency converter 13, and installing a plurality of peak level reduction units (groups) L1-Lm in series between the digital orthogonal modulators E1-EN in the digital modulator unit 11c and the adders 21 and 22.

The peak level reduction units (groups) L1-Lm are respectively provided internally with peak level reduction units M1-MN for the individual carriers. The peak level reduction units M1-MN associated with the individual carriers have the same configuration as the peak level reduction units F1-Fm of the transmitter 3 shown in FIG. 2(a).

In the transmitter 7 of this embodiment, peak voltage is reduced by effecting peak level reduction processing multiple times with respect to the outputs of the digital orthogonal modulators E1-EN in the digital modulator unit 11c. This makes it possible to achieve peak voltage reduction appropriate for the individual carrier levels and to take into account the influence of the digital orthogonal modulators E1-EN.

Thus, as explained in the foregoing, the transmitter 7 of this embodiment, which is configured to conduct transmission using one or more carrier frequencies, is, in the digital modulator unit 11c for conducting digital modulation of the transmit signal, equipped with: (i) the waveform shaping filters C1-CN for subjecting the individual carrier input signals to band restriction; (ii) the digital orthogonal modulators E1-EN for subjecting the output signals from the waveform shaping filters C1-CN to digital orthogonal modulation; (iii) the peak level detectors 14 for comparing the output signals from the digital orthogonal modulators E1-EN and a threshold level, separately for each carrier, to detect the peak level; (iv) one or more peak reduction signal generators 15 for using the output signals from the digital orthogonal modulators E1-EN and the outputs from the peak level detectors 14 to generate a peak reduction signal separately for each carrier; (v) one or more peak reduction signal modulators 17, G1-Gz for subjecting the peak reduction signal to band restriction and digital orthogonal modulation separately for each carrier; (vi) the peak reduction signal synthesizers 18 for, as required, synthesizing the output signals from the one or more peak reduction signal modulators 17, G1-Gz separately for each carrier; (vii) the delay units 23 and 24 for delaying the output signals from the digital orthogonal modulators E1-EN separately for each carrier; and (viii) the subtracters 25 and 26 for subtracting the output of the peak reduction signal synthesizer 18 from the outputs of the delay units 23 and 24 separately for each carrier. Moreover, the transmitter 7 of this embodiment is provided with the adders 21 and 22 for synthesizing multiple carrier signals after multiple operations by the peak level reduction units (groups) L1-Lm.

SIXTH EMBODIMENT

A sixth embodiment of the present invention will now be explained.

This embodiment provides a transmit amplifier comprising the configuration of a transmitter according to one of the foregoing embodiments.

The transmit amplifier of this embodiment is equipped with a transmit power amplification unit for amplifying and outputting the wireless frequency signal output from the transmitter.

For example, there can be realized a configuration wherein a transmit power amplifier that transmits on a plurality of communication channels incorporates a transmitter according to one of the foregoing embodiments and is equipped with an amplifier for amplifying the transmit power.

SEVENTH EMBODIMENT

A seventh embodiment of the present invention will now be explained.

This embodiment provides a base station unit comprising the configuration of a transmitter according to one of the foregoing embodiments.

In a mobile communication system, for example, a linear region of the transmit amplifier must be used and it is important both to reduce peak voltage and to restrict power leakage to outside the band. In this case, a base station unit is implemented that is equipped with a transmit amplifier incorporating the configuration of a transmitter in accordance with one of the foregoing embodiments, which are capable of realizing both peak power reduction and restriction of power leakage to outside the band.

For example, there can be realized a configuration wherein a base station unit of a mobile communication system that transmits on a plurality of communication channels incorporates a transmitter according to one of the foregoing embodiments and is equipped with an amplifier for amplifying the transmit power.

The effectiveness of the transmitters according to the embodiments set out in the foregoing will now be set out concretely.

The effectiveness will be specifically indicated for the transmitter 3 shown in FIG. 2 in conducting wireless communication in the W (Wide band)-CDMA mode.

Figure 8:
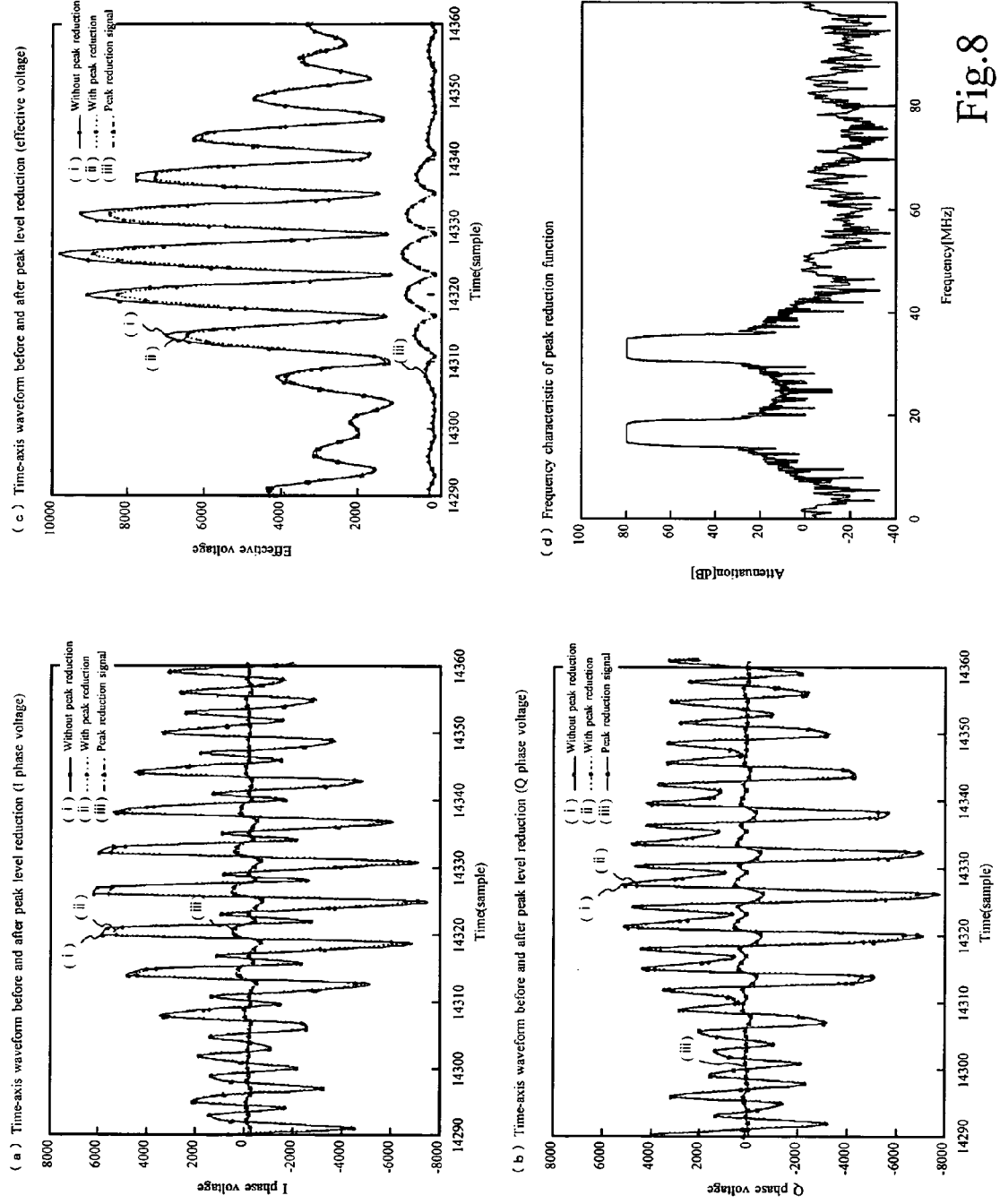
FIG. 8 is a set of graphs showing examples of time-axis waveforms before and after peak level reduction and an example of the frequency characteristic of a peak reduction signal (peak reduction function).

In FIG. 8, the graphs (a), (b) and (c) show examples of the time-axis waveforms of transmit signals before and after peak level reduction.

In graph (a) the lateral axis represents time (sample) and the vertical axis I phase voltage.

In graph (b) the lateral axis represents time (sample) and the vertical axis Q phase voltage.

In graph (c) the lateral axis represents time (sample) and the vertical axis effective voltage.

It can be seen from the graphs (a), (b) and (c) in FIG. 8 that the voltage of the signal in the vicinity of the peak was reduced.

Graph (d) in FIG. 8 shows an example of the frequency characteristic of the peak level reduction signal (peak level reduction function). It can be seen from graph (d) that the peak level reduction signal was band restricted.

Figure 9:
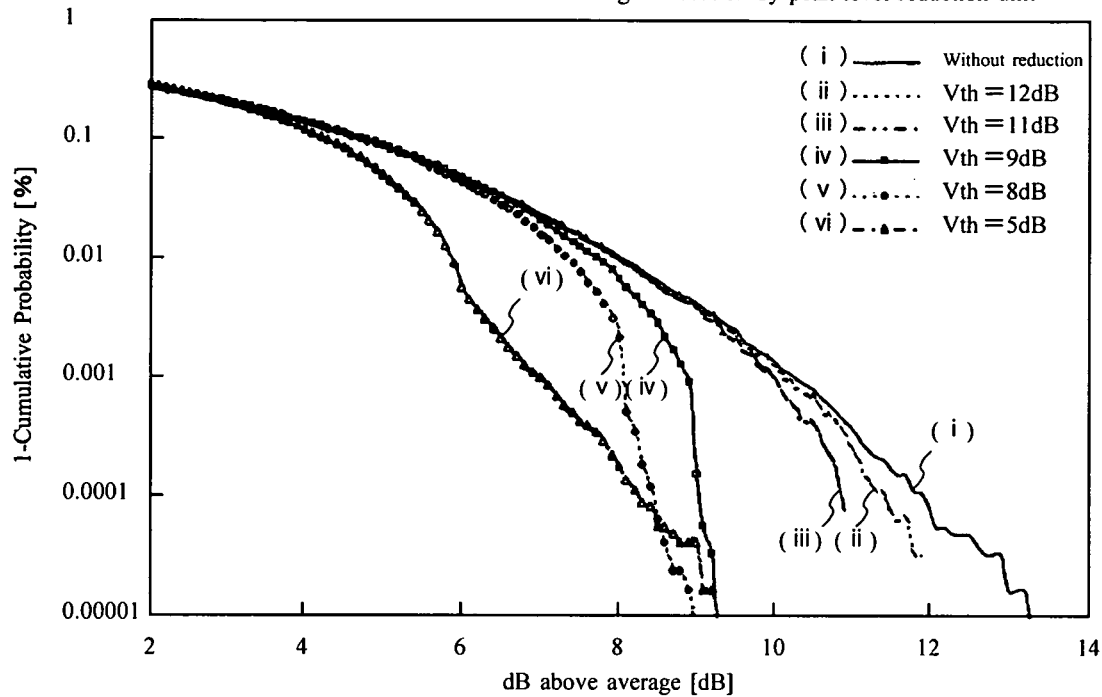
FIG. 9 is a set of graphs exemplifying complementary cumulative distribution functions of the transmitter output.
Figure 9:
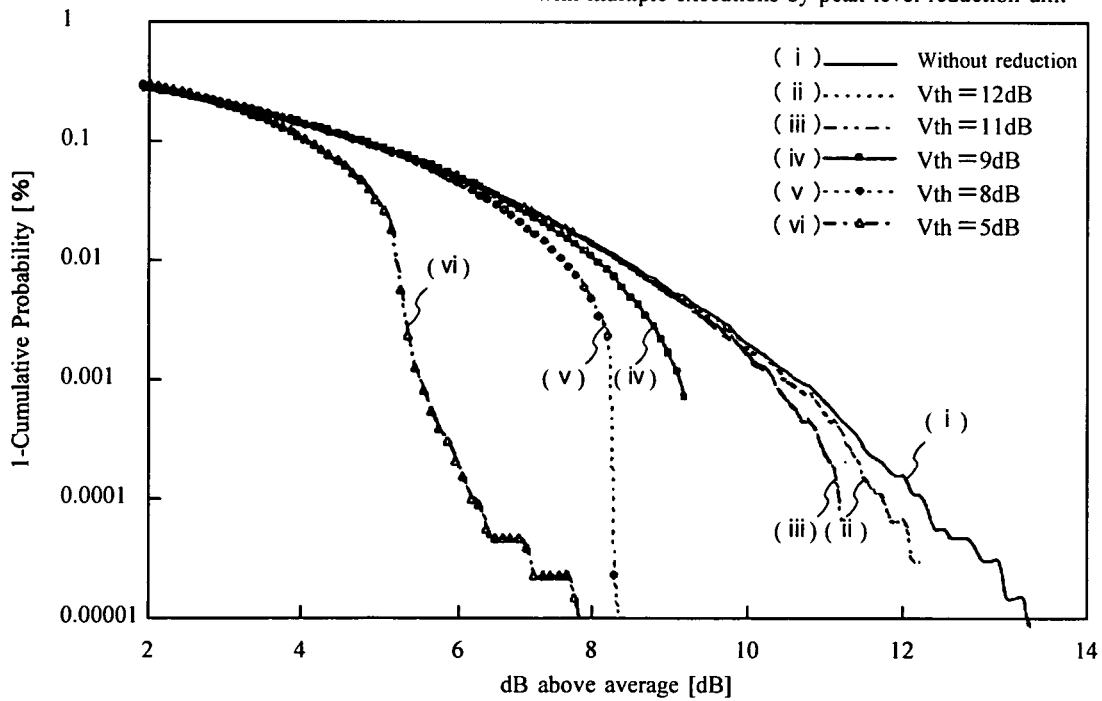

In FIG. 9, the graphs (a) and (b) show an example of the complementary cumulative distribution function (CCDF) of the transmitter output in the case of transmitting 2,560 samples of data using a 32 code multiplex signal and 2 carriers. The carrier frequencies were set at 15.36 MHz and 30.72 MHz.

Graph (a) shows the result for a transmitter executing peak level reduction processing one time (one-stage processing). Graph (b) shows the result for a transmitter executing peak level processing two times (two-stage) processing.

It can be seen from graph (a) that peak level reduction was realized by the system adopted in this embodiment of the present invention. Further, it can be seen from graph (b) that the result of the peak level reduction more closely approaches the set threshold when the peak level reduction processing was conducted multiple times.

Thus, compared with a conventionally configured transmitter, the exemplary transmitter shown in FIG. 2 is better able to achieve both peak power reduction and restriction of power leakage to outside the band at the same time.

Figure 10:
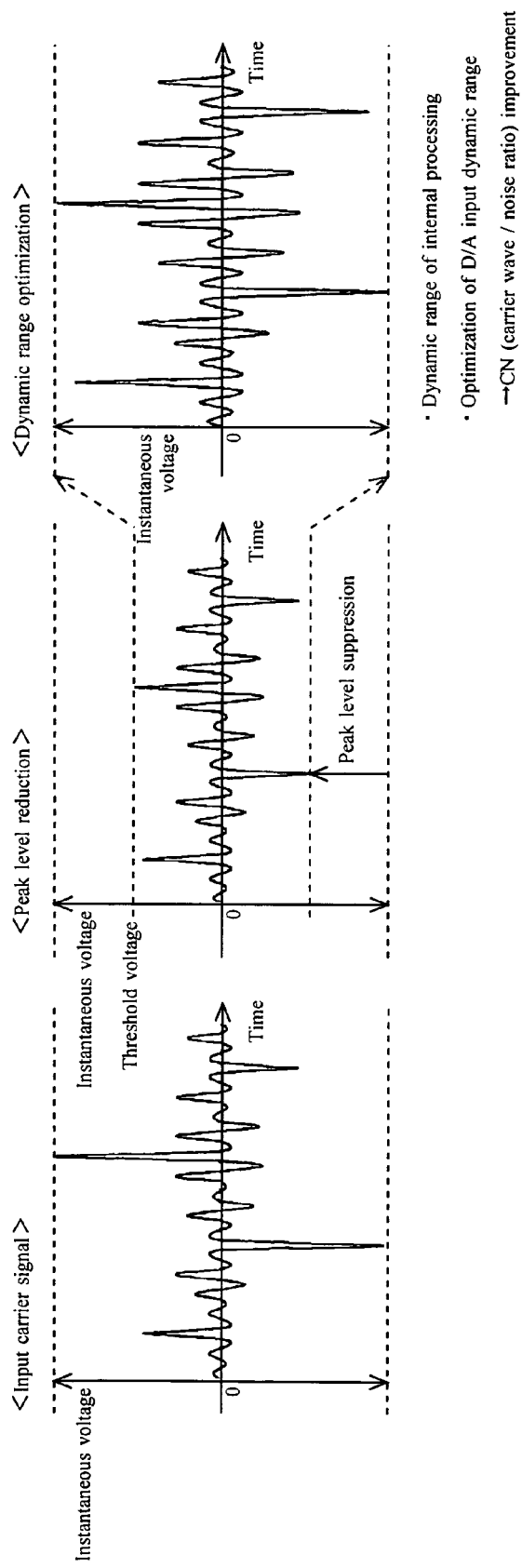
FIG. 10 is a set of graphs exemplifying time-axis waveforms related to the dynamic range realized by a peak level reduction unit.

FIG. 10 shows examples of the time-axis waveforms related to an input carrier signal, peak level reduction and dynamic range optimization. In each graph, the lateral axis represents time and the vertical axis instantaneous voltage.

As shown in FIG. 10, the peak level reduction enables effective utilization of the bit range of the digital modulator and the input bit range of the D/A converter, and also improves the CN (carrier wave/noise ratio).

Figure 11:
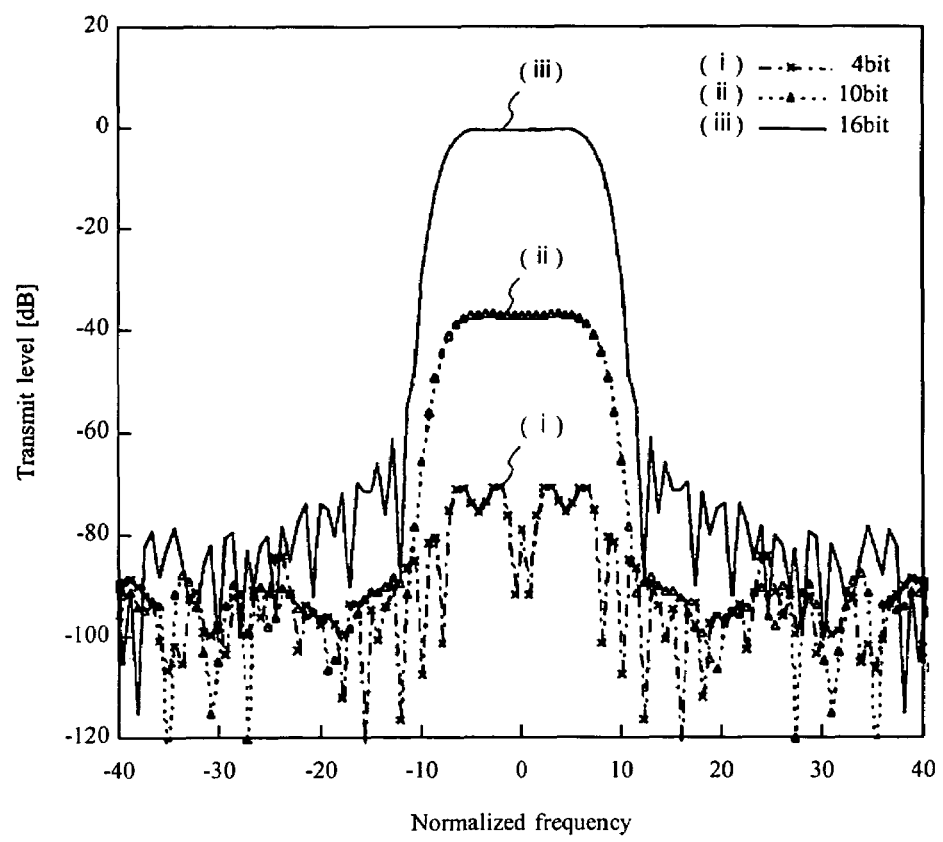
FIG. 11 is a graph showing an example of frequency characteristics of related to the input bit and output level of a D/A converter of the transmitter.

FIG. 11 shows the frequency characteristics of the output level of the transmitter for individual bits input to the D/A converter of the transmitter, in the case where the dynamic range is effectively utilized. The lateral axis of the graph represents normalized frequency and the vertical axis transmit level [dB].

As shown in FIG. 11, a transmitter with enhanced CN (carrier wave/noise ratio) is achieved.

In addition, the peak level reduction makes it possible to raise the operating point of the power amplifier and thus boost the power efficiency of the power amplifier. The improvement in power efficiency (reduced power consumption) helps to lower infrastructure cost.

Thus the transmitter shown in FIG. 2, which is typical of the present invention, is not configured to implement level control by a simple multiplication with respect to a signal peak that exceeds a threshold but is configured to reduce the signal peak and the vicinity thereof by processing that involves repeated use of a modulated peak reduction signal (peak reduction function) for the reduction. As a result, it achieves both peak level reduction and restriction of power leakage to outside the band in combination.

Since the peak level reduction processing explained with respect to the embodiments is nonlinear, it has an impact on a system using the linear modulation method. This means that a tradeoff exists between enhancement of amplifier power efficiency through peak level reduction and communication quality. The peak level reduction therefore needs to be set at an appropriate value. While no concrete values will be given herewith respect to the foregoing embodiments, it suffices for a person such as the operator of the transmitter or transmit amplifier to set a value selected from among various appropriate values.

The transmitter and transmit amplifier of the present invention are not limited to the arrangements and configurations set out in the foregoing but can be modified in various ways. Moreover, the present invention can be construed as being constituted of the aforesaid method or system for executing the processing of the present invention, or as a control program for implementing the method or system or as a recording medium storing the control program. It can therefore be provided in the form of various devices and systems.

Moreover, the present invention is not limited to the field of application described in the foregoing but can also be applied in various other fields.

The various types of processing carried out in the transmitter and transmit amplifier of the present invention can, for example, be conducted by physical means equipped with a processor, memory and the like wherein the processor controls the processing by executing a control program stored in a ROM (Read Only Memory). Otherwise it can be conducted by independent physical circuits constituting functional means for executing the different processing operations.

Moreover, the present invention may also be understood as the aforesaid program per se or as a floppy disk (registered trademark), CD (Compact Disk)-ROM or other computer-readable recording media in which the control program is stored, so that the processing according to the present invention can be implemented by loading said control program from the recording medium into a computer and executing the program by a processor.

What is claimed is:

1. A transmitter for transmitting a suppressed transmit signal generated from a transmit signal including a plurality of carrier signals, the transmitter comprising:

a peak reduction signal generating means for generating a peak reduction signal, the generated peak reduction signal having (i) a signal level based on a transmit signal level threshold for identifying a peak of the transmit signal and based on a signal level of the peak of the transmit signal, and (ii) a phase based on a phase of the transmit signal;

a plurality of peak reduction signal processing means, each of the peak reduction signal processing means subjecting the generated peak reduction signal to a band restriction and an orthogonal modulation by: (A) multiplying, for the plurality of carrier signals of the transmit signal, (i) synthesized carrier transmit signals of the plurality of carrier signals of the transmit signal, and (ii) prescribed coefficient data; and (B) complex-multiplying (i) the result of the multiplying of the synthesized carrier transmit signals and the prescribed coefficient data, and (ii) the generated peak reduction signal, to generate a plurality of complex-multiplied peak reduction signals, each generated complex-multiplied peak reduction signal representing the generated peak reduction signal subjected to the band restriction and the orthogonal modulation;

a peak reduction signal processing results synthesizing means for synthesizing the generated complex-multiplied peak reduction signal output from the plurality of peak reduction signal processing means; and a transmit signal level suppressing means for subtracting a result of the synthesizing of the generated complex-multiplied peak reduction signals from the transmit signal to suppress the signal level of the transmit signal, wherein, when a second peak appears during processing of a first peak by a first of the plurality of peak reduction signal processing means, processing of the second peak is conducted by a second of the plurality of peak reduction signal processing means, and wherein, when a third peak appears, processing of the third peak is conducted by a third of the plurality of peak reduction signal processing means.

2. The transmitter according to claim 1, wherein the peak reduction signal generating means (i) retains a maximum value of the signal level of the transmit signal, (ii) generates the transmit signal level threshold based on the signal level of the transmit signal, and (iii) generates, as the peak reduction signal, a signal having a level corresponding to a difference between the retained maximum value and the generated transmit signal level threshold, and having the same phase as the phase of the transmit signal.

3. The transmitter according to claim 1, further comprising:

a digital modulator for subjecting the transmit signal to waveform shaping and digital modulation;

a plurality of stages of peak level reduction units, each stage including (i) the peak reduction signal generating means, (ii) the transmit signal level suppressing means, and (iii) a peak reduction signal processing means, for reducing a signal level of a peak of a signal output from the digital modulator and for reducing a signal level in a vicinity of the peak; and a frequency converter for converting a frequency of a signal output from a final stage of the plurality of stages and for subjecting the signal output from the final stage of the plurality of stages to analog orthogonal modulation.

4. The transmitter according to claim 1, further comprising:

a digital modulator including (i) waveform shaping filters for subjecting the transmit signal to waveform shaping, (ii) a plurality of stages of peak level reduction units, each stage including (a) the peak reduction signal generating means, (b) the transmit signal level suppressing means, and (c) a peak reduction signal processing means, for reducing a signal level of a peak of a signal output from the waveform shaping filters and for reducing a signal level in a vicinity of the peak, and (iii) digital orthogonal modulators for subjecting a signal output from a final stage of the plurality of stages to orthogonal modulation; and a frequency converter for converting a frequency of a signal output from the digital modulator unit and subjecting the output signal to analog orthogonal modulation.

5. The transmitter according to claim 1, further comprising:

a digital modulator including (i) waveform shaping filters for subjecting the transmit signal to waveform shaping, (ii) digital orthogonal modulators for subjecting a signal output from the waveform shaping filters to digital orthogonal modulation, and (iii) a plurality of stages of peak level reduction units, each stage including (a) the peak reduction signal generating means, (b) the transmit signal level suppressing means, and (c) a peak reduction signal processing means, for reducing a signal level of a peak of a signal output from the digital orthogonal modulators and for reducing a signal level in a vicinity of the peak; and a frequency converter for converting a frequency of a signal output from the digital modulator and for subjecting the output signal to analog orthogonal modulation.

6. A transmit amplifier including a transmitter for transmitting a suppressed transmit signal generated from a transmit signal including a plurality of carrier signals, the transmitter comprising:

a peak reduction signal generating means for generating a peak reduction signal, the generated peak reduction signal having (i) a signal level based on a transmit signal level threshold for identifying a peak of the transmit signal and based on a signal level of the peak of the transmit signal, and (ii) a phase based on a phase of the transmit signal;

a plurality of peak reduction signal processing means, each of the peak reduction signal processing means subjecting the generated peak reduction signal to a band restriction and an orthogonal modulation by: (A) multiplying, for the plurality of carrier signals of the transmit signal, (i) synthesized carrier transmit signals of the plurality of carrier signals of the transmit signal, and (ii) prescribed coefficient data; and (B) complex-multiplying (i) the result of the multiplying of the synthesized carrier transmit signals and the prescribed coefficient data, and (ii) the generated peak reduction signal, to generate a plurality of complex-multiplied peak reduction signals, each generated complex-multiplied peak reduction signal representing the generated peak reduction signal subjected to the band restriction and the orthogonal modulation;

a peak reduction signal processing results synthesizing means for synthesizing the generated complex-multiplied peak reduction signals output from the plurality of peak reduction signal processing means; and a transmit signal level suppressing means for subtracting a result of the synthesizing of the generated complex-multiplied peak reduction signals from the transmit signal to suppress the signal level of the transmit signal, wherein, when a second peak appears during processing of a first peak by a first of the plurality of peak reduction signal processing means, processing of the second peak is conducted by a second of the plurality of peak reduction signal processing means, and wherein, when a third peak appears, processing of the third peak is conducted by a third of the plurality of peak reduction signal processing means.

7. The transmit amplifier according to claim 6, wherein the peak reduction signal generating means (i) retains a maximum value of the signal level of the transmit signal, (ii) generates the transmit signal level threshold based on the signal level of the transmit signal, and (iii) generates, as the peak reduction signal, a signal having a level corresponding to a difference between the retained maximum value and the generated transmit signal level threshold, and having the same phase as the phase of the transmit signal.

8. A base station including a transmitter for transmitting a suppressed transmit signal generated from a transmit signal including a plurality of carrier signals, the transmitter comprising:

a peak reduction signal generating means for generating a peak reduction signal, the generated peak reduction signal having (i) a signal level based on a transmit signal level threshold for identifying a peak of the transmit signal, and based on a signal level of the peak of the transmit signal and (ii) a phase based on a phase of the transmit signal;

a plurality of peak reduction signal processing means, each of the peak reduction signal processing means subjecting the generated peak reduction signal to a band restriction and an orthogonal modulation by: (A) multiplying, for the plurality of carrier signals of the transmit signal, (i) synthesized carrier transmit signals of the plurality of carrier signals of the transmit signal, and (ii) prescribed coefficient data; and (B) complex-multiplying (i) the result of the multiplying of the synthesized carrier transmit signals and the prescribed coefficient data, and (ii) the generated peak reduction signal, to generate a plurality of complex-multiplied peak reduction signals, each generated complex-multiplied peak reduction signal representing the generated peak reduction signal subjected to the band restriction and the orthogonal modulation;

a peak reduction signal processing results synthesizing means for synthesizing the generated complex-multiplied peak reduction signals output from the plurality of peak reduction signal processing means; and a transmit signal level suppressing means for subtracting a result of the synthesizing of the generated complex-multiplied peak reduction signals from the transmit signal to suppress the signal level of the transmit signal, wherein, when a second peak appears during processing of a first peak by a first of the plurality of peak reduction signal processing means, processing of the second peak is conducted by a second of the plurality of peak reduction signal processing means, and wherein, when a third peak appears, processing of the third peak is conducted by a third of the plurality of peak reduction signal processing means.

9. The base station according to claim 8, wherein the peak reduction signal generating means (i) retains a maximum value of the signal level of the transmit signal, (ii) generates the transmit signal level threshold based on the signal level of the transmit signal, and (iii) generates, as the peak reduction signal, a signal having a level corresponding to a difference between the retained maximum value and the generated transmit signal level threshold, and having the same phase as the phase of the transmit signal.

* * * * *